United States Patent
Chueh et al.

(10) Patent No.: US 7,227,764 B2
(45) Date of Patent: Jun. 5, 2007

(54) VOLTAGE-REGULATING DEVICE FOR CHARGE PUMP

(75) Inventors: Lung-Yi Chueh, Taoyuan (TW); Yu-Shen Lin, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 11/286,204

(22) Filed: Nov. 23, 2005

(65) Prior Publication Data

US 2006/0104098 A1    May 18, 2006

Related U.S. Application Data

(63) Continuation-in-part of application No. 10/647,708, filed on Aug. 25, 2003, now abandoned.

(30) Foreign Application Priority Data

May 29, 2003   (TW) .............................. 92114628 A

(51) Int. Cl.
*H02M 3/18* (2006.01)
*H02M 3/02* (2006.01)
(52) U.S. Cl. ....................... 363/60; 327/536
(58) Field of Classification Search ............. 363/59, 363/60; 327/536
See application file for complete search history.

(56) References Cited

U.S. PATENT DOCUMENTS

| | | | | | |
|---|---|---|---|---|---|
| 5,841,703 | A | * | 11/1998 | Wojciechowski | 365/189.09 |
| 6,316,301 | B1 | * | 11/2001 | Kant | 438/197 |
| 6,525,595 | B2 | * | 2/2003 | Oku | 327/536 |
| 6,670,844 | B2 | | 12/2003 | Kobayashi et al. | 327/536 |

FOREIGN PATENT DOCUMENTS

CN            1365147         8/2002

\* cited by examiner

*Primary Examiner*—Gary L Laxton
(74) *Attorney, Agent, or Firm*—Thomas, Kayden, Horstemeyer & Risley

(57) ABSTRACT

A voltage-regulating device for charge pump is disclosed. The charge pump outputs an output voltage according to the operation of at least one clock signal. The voltage-regulating device includes at least one voltage regulating capacitor and at least inverter. The inverter is for receiving the clock signal and outputting an inverse clock signal accordingly. The voltage regulating capacitor has one terminal coupled to the output voltage and the other terminal coupled to the inverter for receiving the inverse clock signal. The width of a PMOS transistor is different from the width of an NMOS transistor in the inverter.

2 Claims, 4 Drawing Sheets

VOLTAGE-REGULATING DEVICE FOR CHARGE PUMP

This application is a continuation-in-part of U.S. application Ser. No. 10/647,708, filed on Aug. 25, 2003, now abandoned which U.S. application claimed the benefit of Taiwan application Serial No. 92114628, filed May 29, 2003.

BACKGROUND OF THE INVENTION

1. Field of the Invention

The invention relates in general to a voltage-regulating device, and more particularly to a voltage-regulating device for charge pump.

2. Description of the Related Art

Charge pumps can be used to increase voltage. Take the writeable flash memory for example: ordinary reading only requires a low voltage, e.g., 3V, whereas writing requires a high voltage, e.g. 12V. While ordinary integrated circuit chips (IC chips) normally have only a power supply of small voltage, e.g. 3V, a charge pump can herein be used to increase the direct current (DC) voltage if a larger-than-3V operating voltage, e.g. 12 V, is needed.

Conventional charge pumps have a number of varieties such as two-phase charge pump, four-phase charge pump, etc. Herein a two-phase charge pump is illustrated for elaboration. Please refer to FIG. 1, a schematic circuit diagram for a conventional two-phase charge pump. Two-phase charge pump 100 includes diodes D1, D2, D3, and D4, capacitors C1, C2, and C3. For the convenience of elaboration, diodes D1, D2, D3, and D4 are assumed to be ideal diodes with zero turn-on voltage. The positive electrode of diode D1 is coupled to DC power supply Vdd while the negative electrode of diode D1 is coupled to node N1 together with the positive electrode of diode D2 and one terminal of capacitor C1, wherein the other terminal of capacitor C1 receives clock signal CLK. The negative electrode of diode D2 is coupled to node N2 together with the positive electrode of diode D3 and one terminal of capacitor C2, wherein the other terminal of capacitor C2 receives inverse clock signal CLK', inverse of clock signal CLK. The negative electrode of diode D3 is coupled to node N3 together with the positive electrode of diode D4 and one terminal of capacitor C3, wherein the other terminal of capacitor C3 receives clock signal CLK. The negative electrode voltage of diode D4 is exactly the charge pump output voltage Vo.

FIG. 2A is a schematic voltage diagram for the nodes of a charge pump. The voltage for DC power supply Vdd is 3V; the high level and low level voltages for clock signal CLK are 3V and 0V respectively; the initial voltage for node N1 is 3V. When the voltage of clock signal CLK changes to high level, the cross voltage of capacitor C1 still remains at 3V causing V(N1), the voltage of node N1, to be raised to 6V. Similarly, V(N2), the voltage of node N2, is raised to 9V while V(N3), the voltage of node N3, is raised to 12V. Consequently, output voltage Vo is raised to 12V.

FIG. 2B is a schematic output voltage diagram for a conventional charge pump. While the charge pump raises the voltage step by step, output voltage Vo will eventually be raised to 12V. Due to the discharge effect of capacitor C3, however, output voltage Vo starts to drop slightly when the clock signal CLK coupled to capacitor C3 is at low level, but starts to rise up slightly when clock signal CLK is at high level. In worst cases, output voltage Vo will swing for ±1V and result in an undesired ripple-like waveform of the output voltage.

SUMMARY OF THE INVENTION

It is therefore an object of the invention to provide a voltage-regulating device for charge pump.

According to the object of the invention, a voltage-regulating device for charge pump is provided. The charge pump outputs an output voltage according to a clock signal. The voltage-regulating device includes a voltage regulating capacitor and an inverter. The voltage regulating capacitor has one terminal coupled to the output voltage and the inverter is coupled to the other terminal of the voltage regulating capacitor for receiving the clock signal and accordingly outputting an inverse clock signal. The inverter includes at least a first P-type metal oxide semiconductor (PMOS) transistor and a first N-type metal oxide semiconductor (NMOS) transistor, and the width of the first PMOS transistor is different from the width of the first NMOS transistor.

According to the object of the invention, a voltage-regulating device for charge pump is provided. The charge pump outputs an output voltage according to a first clock signal, a second clock signal, a third clock signal, and a fourth clock signal. The voltage-regulating device includes a first inverter, a second inverter, a third inverter, a fourth inverter, a first inverter, a second inverter, a third inverter, and a fourth inverter. The first inverter is for receiving the first clock signal and outputting a first inverse clock signal accordingly, the second inverter is for receiving the second clock signal and outputting a second inverse clock signal accordingly, the third inverter is for receiving the third clock signal and outputting a third inverse clock signal accordingly, while the fourth inverter is for receiving the fourth clock signal and outputting a fourth inverse clock signal accordingly. The first voltage regulating capacitor has one terminal coupled to the output voltage and the other terminal coupled to the first inverter, the second voltage regulating capacitor has one terminal coupled to the output voltage and the other terminal coupled to the second inverter, the third voltage regulating capacitor has one terminal coupled to the output voltage and the other terminal coupled to the third inverter, and the fourth voltage regulating capacitor has one terminal coupled to the output voltage and the other terminal coupled to the fourth inverter. Each inverter includes at least a PMOS transistor and a NMOS transistor, and the width of the PMOS transistor is different from the width of the NMOS transistor in each inverter.

Other objects, features, and advantages of the invention will become apparent from the following detailed description of the preferred but non-limiting embodiments. The following description is made with reference to the accompanying drawings.

DETAILED DESCRIPTION OF THE INVENTION

The charge pump uses the capacitor to raise the DC (direct current) voltage and inevitably results in a slightly ripple waveform of the output voltage. The spirit of the invention lies in coupling a voltage regulating waveform, which is opposite to the ripple, to the output voltage of the charge pump such that the waveform of the output voltage goes smoothly and the quality of power supply can be enhanced.

Embodiment One

Figure 3:
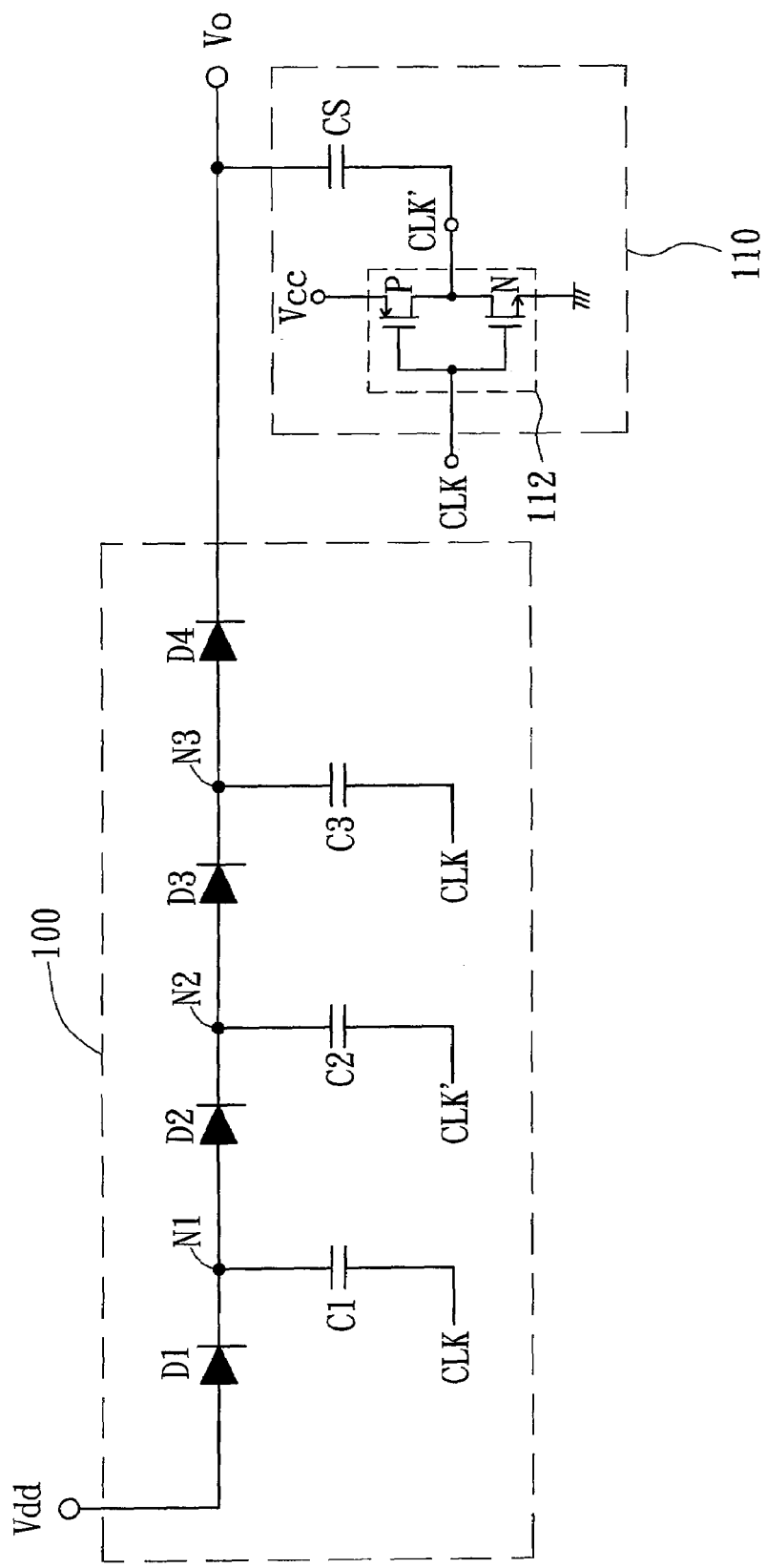
FIG. 3 is a schematic diagram of a voltage-regulating device for charge pump according to a first embodiment of the invention.

FIG. 3 is a schematic diagram of a voltage-regulating device for charge pump according to a first embodiment of the invention. In the embodiment, the charge pump 100 is illustrated by using a two-phase charge pump. The charge pump 100 raises the level of an input voltage Vdd to the level of an output voltage Vo according to a clock signal CLK. The voltage-regulating device 110 is coupled to the output voltage Vo of the charge pump 100 and includes a voltage regulating capacitor Cs and an inverter 112. The inverter 112 is for receiving the clock signal CLK and outputting an inverse clock signal CLK' accordingly. The capacitor Cs has one terminal coupled to the output voltage Vo of the charge pump 100 and the other terminal coupled to the inverter 112 for receiving the inverse clock signal CLK'.

Figure 1:
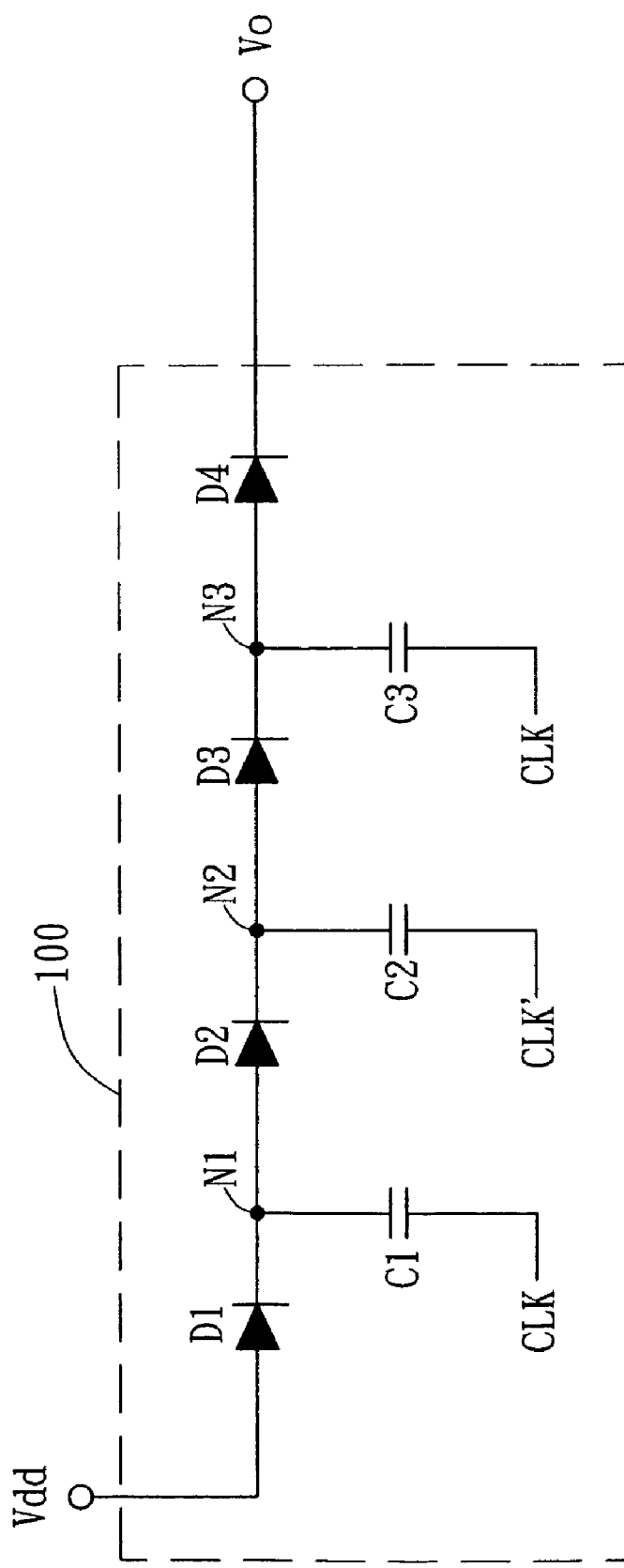
FIG. 1 is a schematic circuit diagram for a conventional two-phase charge pump.
Figure 2A:
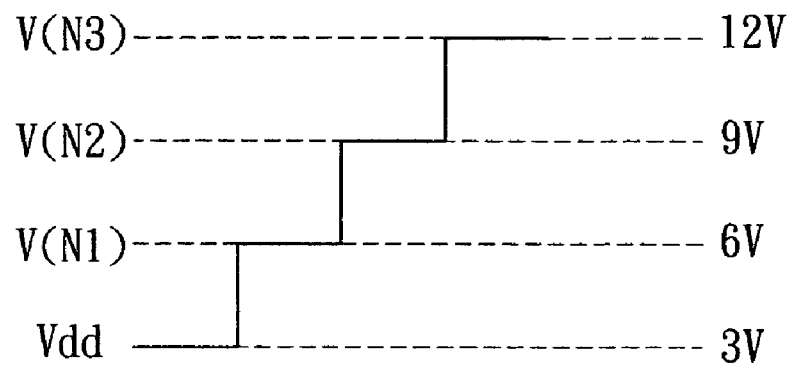
FIG. 2A is a schematic voltage diagram for the nodes of a charge pump.
Figure 2B:
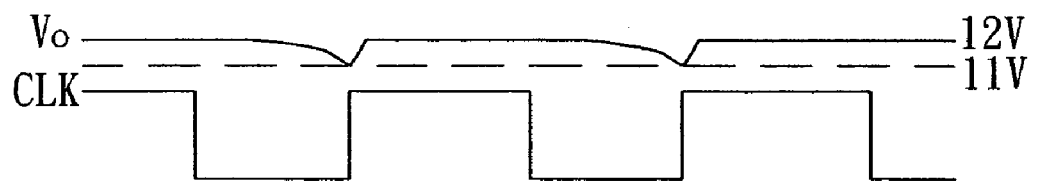
FIG. 2B is a schematic output voltage diagram for a conventional charge pump.

First of all, the operating principles for the charge pump 100 are discussed below. The initial voltage for node N1 is 3V. When the voltage of the clock signal CLK changes to a high level, the voltage drop of the capacitor C1 still remains at 3V causing V(N1), the voltage of node N1, to be raised to 6V. Similarly, V(N2), the voltage of node N2, is raised to 9V while V(N3), the voltage of node N3, is raised to 12V. Consequently, the output voltage Vo is raised to 12V. However, as illustrated in FIG. 2B, when the clock signal CLK is changed to a low level, the output voltage Vo drops slightly due to the discharge effect of capacitor C3 resulting in an undesired waveform of the output voltage Vo. Particularly when the voltage of the clock signal CLK is raised to the high level, the output voltage Vo will have an abrupt increase leading to an unstable output of voltage.

According to the received inverse clock signal CLK', the voltage regulating capacitor Cs in the invention couples a voltage regulating wave to the output voltage Vo of the charge pump 100. Since the inverse clock signal CLK' received by the voltage regulating capacitor Cs is inverse with the clock signal CLK for the last stage of voltage raising in the charge pump 100, the capacitor Cs can adjust the upcoming ripple due to previous stage. When the output voltage Vo starts to drop down (from 12V) due to the discharge of the capacitor C3 as the clock signal CLK falls from the high level, the inverse clock CLK' rises to the high level and provides the voltage regulating wave of a positive voltage to the output voltage Vo via the capacitor Cs and thus the output voltage Vo can maintain at the desired level (12V). When the output voltage Vo starts to rise up (from the 12V) due to the charging of the capacitor C3 as the clock signal CLK goes up from the low level, the inverse clock CLK' falls down to the low level and provides the voltage regulating wave of a negative voltage to the output voltage Vo and thus the output voltage Vo can maintain at the desired level (12V). By doing so, the waveform of the output voltage Vo becomes more regulated.

As shown above, the inverter 112 usually includes at least a P-type metal oxide semiconductor (PMOS) transistor P and an N-type metal oxide semiconductor (NMOS) transistor N for performing the voltage inversion operation. The width of the PMOS transistor P is designed to be larger than that of the NMOS transistor N, so the inverse clock signal CLK' outputted by the inverter 112 can have a larger voltage boosting ability in raising the output voltage Vo to the desired level, thereby shrinking the undesired ripple and generating a more ideal wave form of the output voltage Vo.

Figures 4, 5:
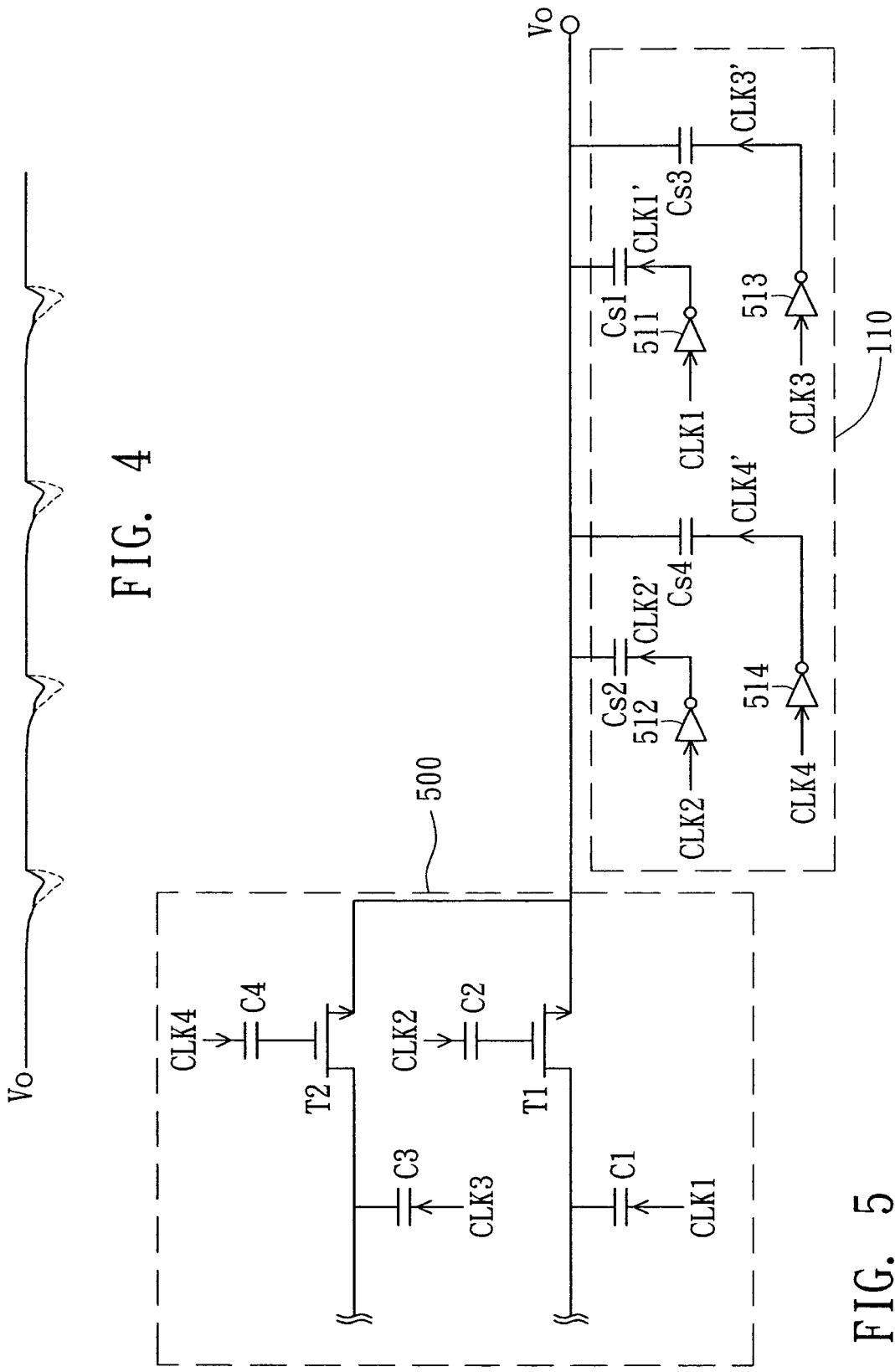
FIG. 4 shows the waveform of the output voltage Vo of the charge pump 100 according to the voltage-regulating device 110 in FIG. 3.
FIG. 5 is a schematic diagram of a voltage-regulating device for charge pump according to a second embodiment of the invention.

FIG. 4 shows the waveform of the output voltage Vo of the charge pump 100 according to the voltage-regulating device 110 in FIG. 3. Waveforms shown by dotted lines are the waveforms of the output voltage Vo before voltage regulation and are sharper than those shown by solid lines which are waveforms of the output voltage Vo after voltage regulation. This comparison shows that the invention does help to regulate the output voltage Vo.

The voltage regulating capacitor Cs of the invention is an appropriately selected capacitor whose capacitance is relatively small compared to the loading capacitance at the output terminal of the charge pump 100. Amplitude of the inverse clock signal CLK' received by the voltage regulating capacitor Cs will provide the voltage regulating wave of only a small amplitude due to the voltage division of the voltage regulating capacitor Cs and the loading capacitor, which can regulate the output voltage Vo to a stable level without affecting the DC value of the output voltage Vo.

Embodiment Two

FIG. 5 is a schematic diagram of a voltage-regulating device for charge pump according to a second embodiment of the invention. In the embodiment, the voltage regulating device 510 is applied to a four-phase charge pump 500 for regulating an output voltage Vo of the charge pump 500. Since the four-phase charge pump 500 operates according to four sets of clock signals, namely, CLK1, CLK2, CLK3, and CLK4, four voltage regulating capacitors are needed. The voltage-regulating device 510 includes voltage regulating capacitors Cs1~Cs4, and inverters 511~514. Each Inverters 511~514, same as inverter 112, includes at least a PMOS transistor and an NMOS transistor (not shown in the figure). The inverters 511~514 are respectively for receiving the clock signal CLK1~CLK4 and outputting inverse clock signals CLK1'~CLK4' accordingly. The voltage regulating capacitor Cs1 (Cs2, Cs3, or Cs4) has one terminal coupled to the output voltage Vo and the other terminal coupled to the inverter 511 (512, 513, or 514) for receiving the inverse clock signal CLK1' (CLK2', CLK3', or CLK4').

As shown in FIG. 5, the charge pump 500 includes NMOS transistors T1 and T2. The sources of the NMOS transistors T1 and T2 are for respectively outputting the output voltage Vo, the gates of the NMOS transistors T1 and T2 are respectively coupled to the clock signals CLK2 and CLK4 via the capacitors C2 and C4, while the drains of the NMOS transistors T1 and T2 are respectively coupled to the clock signals CLK1 and CLK3 via capacitors C1 and C3.

Since the inverse clock signals CLK1'~CLK4' received by the voltage regulating capacitor Cs1~Cs4 are inverse with the clock signals CLK1~CLK4 for the charge pump 500, according to the received inverse clock signals CLK1'~CLK4', the capacitors Cs1~Cs4 can just provide an appropriate bias to reduce the above-mentioned ripple in the output voltage Vo. When the clock signal CLK2 (or CLK4) changes to a high level in the meanwhile the clock signal CLK1 (or CLK3) changes to the high level, the NMOS transistor T1 or T2 is turned on to output the required voltage-raising output voltage Vo.

However, when the output voltage Vo starts to drop down (from the desired level) due to the discharge of the capacitor C1 (or C3) as the clock signal CLK1 (or CLK3) falls from the high level, the inverse clock CLK1' (or CLK3') rises to the high level and provides a voltage regulating wave of a positive voltage to the output voltage Vo via the capacitor C1 (or C3) and thus the output voltage Vo can maintain at the desired level. Similar to the voltage-regulating device 110 in the first embodiment, the width of the PMOS transistor can be designed to be larger than the width of the NMOS transistor in the inverter 511 (or 513) of the second embodiment. Therefore, the inverse clock signal CLK1' (or CLK3') outputted by the inverter 511 (or 513) can have a larger voltage boosting ability in raising the output voltage Vo to the desired level, thereby shrinking the undesired ripple and generating a more ideal waveform of the output voltage Vo.

Similarly, when the output voltage Vo starts to rise up (from the desired level) due to the charging of the capacitor C2 (or C4) as the clock signal CLK2 (or CLK4) goes up from the low level, the inverse clock CLK2' (or CLK4') falls down to the low level and provides the voltage regulating wave of a negative voltage to the output voltage Vo and thus the output voltage Vo can maintain at the desired level. In this case, the width of the NMOS transistor can be designed to be larger than the width of the PMOS transistor in the inverter 512 (or 514). Therefore, the inverse clock signal CLK2' (or CLK4') outputted by the inverter 512 (or 514) can have a larger voltage boosting ability in lowering down the output voltage Vo to the desired level, thereby shrinking the undesired ripple and generating a more ideal waveform of the output voltage Vo.

Besides, the charge pump 500 outputs the output voltage Vo to a load and the capacitance of the capacitors Cs1~Cs4 is smaller than the capacitance of the load.

The voltage-regulating device disclosed in the above embodiment of the invention has the advantage of effectively reducing the ripple issue occurred in the output voltage and improving the quality of the output power provided by the charge pump.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A voltage regulating device for a charge pump, the charge pump outputting an output voltage according to a first clock signal, a second clock signal, a third clock signal, and a fourth clock signal, the voltage regulating device comprising:

a first inverter, for receiving the first clock signal and outputting a first inverse clock signal accordingly;

a second inverter, for receiving the second clock signal and outputting a second inverse clock signal accordingly;

a third inverter, for receiving the third clock signal and outputting a third inverse clock signal accordingly;

a fourth inverter, for receiving the fourth clock signal and outputting a fourth inverse clock signal accordingly;

a first voltage regulating capacitor, having one terminal coupled to the output voltage and the other terminal coupled to the first inverter;

a second voltage regulating capacitor, having one terminal coupled to the output voltage and the other terminal coupled to the second inverter;

a third voltage regulating capacitor, having one terminal coupled to the output voltage and the other terminal coupled to the third inverter; and a fourth voltage regulating capacitor, having one terminal coupled to the output voltage and the other terminal coupled to the fourth inverter;

wherein each inverter comprises at least a PMOS transistor and a NMOS transistor, and the width of the PMOS transistor is different from the width of the NMOS transistor in each inverter;

wherein the charge pump comprises a first NMOS transistor and a second NMOS transistor, the sources of the first NMOS transistor and the second NMOS transistor are for respectively outputting the output voltage, the gates of the first NMOS transistor and the second NMOS transistor are respectively coupled to the second clock signal and the fourth clock signal, the drains of the first NMOS transistor and the second NMOS transistor are respectively coupled to the first clock signal and the third clock signal, the width of the NMOS transistor is larger than the width of the PMOS transistor in the second inverter and the fourth inverter, and the width of the PMOS transistor is larger than the width of the NMOS transistor in the first inverter and the third inverter.

2. The voltage regulating device for a charge pump according to claim 1, wherein the charge pump outputs the output voltage to a load and the capacitance of the first, the second, the third and the fourth capacitor is smaller than the capacitance of the load.

* * * * *